Figure 1:
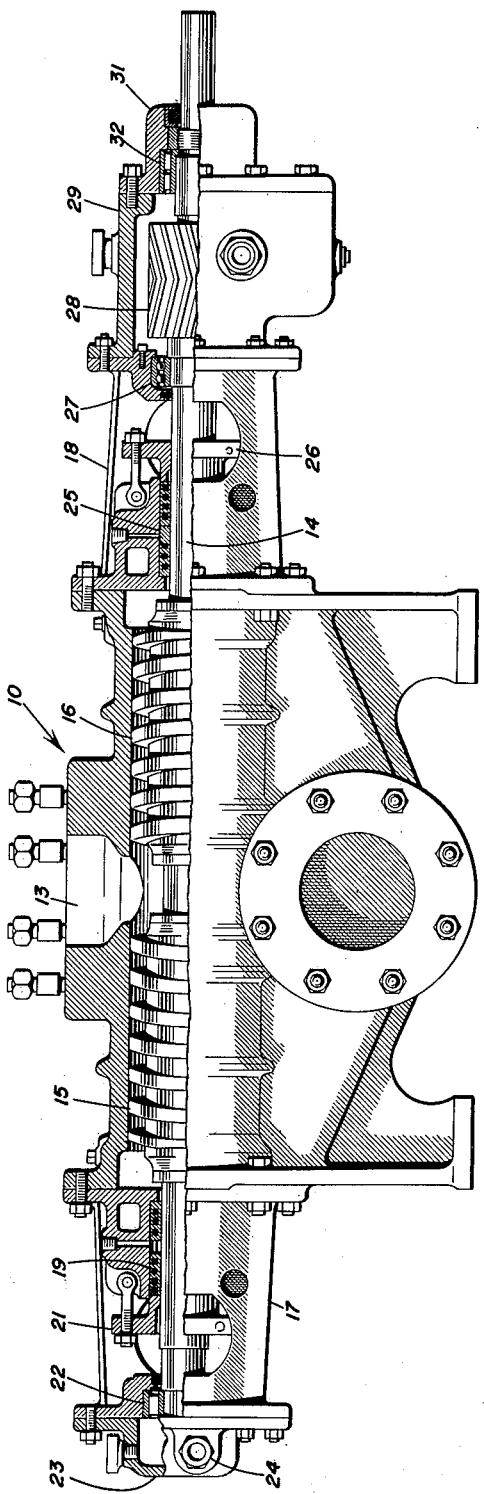

April 14, 1964 F. W. AMADON ETAL 3,128,715

PUMP

Filed Feb. 14, 1962

FRANK W. AMADON
ALBERT A. ZALIS

INVENTORS

BY Kedmon S. Blodgett

ATTORNEY

United States Patent Office 3,128,715
Patented Apr. 14, 1964

3,128,715
PUMP
Frank W. Amadon and Albert A. Zalis, Warren, Mass., assignors to Warren Pumps, Inc., Warren, Mass., a corporation of Massachusetts
Filed Feb. 14, 1962, Ser. No. 173,159
3 Claims. (Cl. 103—128)

This invention relates to a pump and more particularly to apparatus arranged to increase the pressure and flow in a fluid system.

There are many instances in the pumping of fluids where a pump of the conjugate type, such as a screw pump, is very useful. A screw pump is one in which two rotors are arranged in generally parallel, side-by-side relationship and are provided with mating screw surfaces. In order to produce proper conjugated action, it is necessary that the surfaces be finished very accurately, and any slight corrosion of the conjugate surfaces produces a considerable deterioration in the performance of the pump. While it is true that the rotors can be made of stainless steel or similar corrosion-proof metal, the cost of such rotors is very great, so that the uses of such pumps for corrosive liquids has been limited to applications where a high cost was not objectionable. Furthermore, under some extreme conditions of operation, galling takes place with metallic conjugate members which has often led to breakdown of the active surfaces. There has been an unsatisfied need, also, for a conjugate-type pump having a rotor with non-corrosive and yielding qualities which, at the same time, is capable of maintaining the torsional and bending strength necessary to absorb the driving forces and maintain the geometric relationships necessary for accurate conjugate action. These and other difficulties experienced with the prior art devices have been obviated in a novel manner by the present invention.

It is, therefore, an outstanding object of the invention to provide a conjugate-type pump having rotors which are not subject to attack by corrosive fluids.

Another object of this invention is the provision of a screw-type pump having rotors with elastomer qualities but, nevertheless with sufficient stiffness to maintain proper geometry for accurate conjugate action.

A further object of the present invention is the provision of a screw-type pump in which each rotor consists of a stiff metallic shaft and an elastic conjugate member locked together to operate as a unit.

It is a further object of the invention to provide a screw-type pump for use with corrosive fluids which pump may be manufactured from inexpensive materials.

With these and other objects in view, as will be apparent to those skilled in the art, the invention resides in the combination of parts set forth in the specification and covered by the claims appended hereto.

Figure 2:
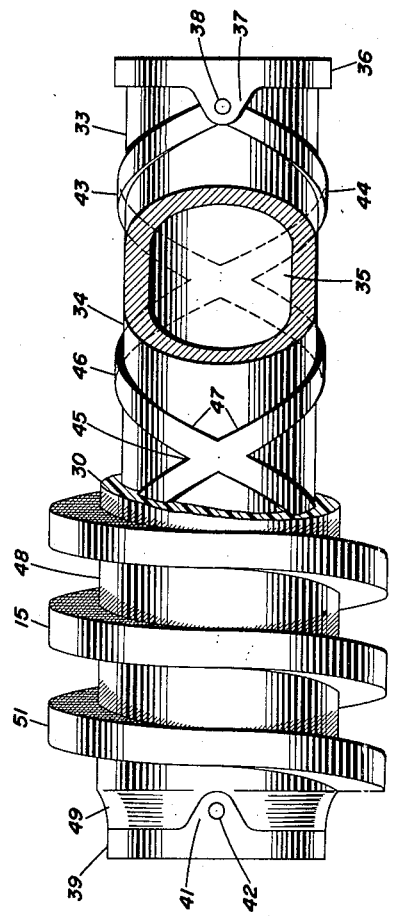

The character of the invention, however, may be best understood by reference to certain of its structural forms, as illustrated by the accompanying drawings in which:

FIG. 1 is a front elevational view with parts broken away of a pump embodying the principles of the present invention, and FIG. 2 is a somewhat enlarged elevational view of an important element of the apparatus with portions broken away.

Referring first to FIG. 1, wherein are best shown the general features of the invention, the pump, indicated generally by the reference numeral 10, is shown as consisting of a main body 11 having an inlet port 12 and an outlet port 13. Mounted in the body 11 is a shaft 14 on which are mounted conjugate screw members 15 and 16. A similar shaft and conjugate male screw members are arranged in parallel, side-by-side relationship, to the shaft 14 but cannot be seen in the drawing, although the conjugate surfaces engage in the usual manner to provide a pumping action. Passages (not shown) lead from the inlet port 12 to the outboard ends of the conjugate screw members 15 and 16, while the outlet port 13 is, as is shown, joined to the adjacent ends of these members. Mounted on one end of the housing 11 is a supporting bracket 17, while a similar supporting bracket 18 is mounted on the other end of the housing. The shaft 14 extends through the bracket 17 and is engaged by a stuffing box 19 which is provided with a split gland 21. Mounted in outer end of the bracket is a set of heavy duty roller bearings 22 in which lies one end of the shaft 14. A cap 23 is bolted over the outer end of the supporting bracket 17 and is suitably provided with a large oil reservoir 24 which is provided with a vent and sight glass in the usual manner. The outer end of the shaft 14 extends through the supporting bracket 18 and is surrounded by a stuffing box 25 which is suitably provided with a split gland 26. Mounted in the outboard end of the bracket 18 is a set of heavy duty ball bearings 27 through which the shaft 14 extends. Keyed to the shaft 14 is a herringbone timing gear 28 which engages a similar gear on the aforementioned parallel shaft. The gear 28 and the portion of the shaft on which it is mounted lie in a housing 29 which is bolted at the outer end of the bracket 18. This housing acts as an oil reservoir and is provided with a suitable vent and sight glass for the timing gears and bearings. Bolted on the outer end of the housing 29 is a cap 31 which is provided with heavy duty roller bearings 32 through which the shaft 14 extends. The shaft protrudes outwardly of the cap 31, as is evident in the drawing, and may be provided with a connection to a suitable electric drive motor. The other shaft in the housing does not so protrude and the driving force takes place through the shaft 14 and through the timing gears 28 into the said other shaft.

Referring to FIG. 2, which shows the details of the conjugate member 15, it can be seen that it consists generally of a metal sleeve 33 and a conjugate screw body 30. The body 30 is formed of an elastomer material having high resistance to corrosion; such a material is polytetrafluoroethylene commonly known as "Teflon." The sleeve is provided with a generally cylindrical portion 34 having a coaxial bore 35 through which the shaft 14 passes. At one end of the cylindrical portion is provided with a radial flange 36 having two diametrically positioned inwardly-directed bosses 37 each having aligned circular apertures 38 through which a pin is passed to lock the sleeve to the shaft 14. Similarly, at the other end, the cylindrical portion is provided with a radial flange 39 having diametrically-opposed inwardly-directed bosses 41 through which extends an aperture 42 to receive a locking pin. Extending outwardly from the surface of the cylindrical portion 34 are a pair of helical flanges 43 and 44 which are of opposite hand and have a relatively short lead so that they cross in at least two positions between the flanges 36 and 39, one of the positions being at the crossing 45. Each flange is provided with a generally cylindrical outer surface 46 and radial surfaces 47 which may be provided with a slight undercutting so that the angle between the surface 34 and the surface 47 may be less than 90°. The conjugate screw body 30 is molded on the sleeve 33 and is provided with a cylindrical portion 48 which merges through a transition surface 49 with the outer edge surface of the flange 39. Extending outwardly from the cylindrical portion is a male screw 51 provided with suitable conjugate surfaces for engaging a similar male screw on the other shaft.

The operation of the invention will now be readily understood in view of the above description. The rotation of the shaft 14 by means of the motor to which it is attached causes a corresponding rotation of the other shaft through the timing gear 28 and the corresponding gear on the other shaft. Material enters the inlet port 12, passes to the ends of the conjugate screw members 15 and 16, and is pumped toward the outlet port 13, the pressure in the fluid being increased from the inlet port to the outlet port in the usual manner. The conjugate screw body 30 and its corresponding other elements on the shafts, being formed of polytetrafluoroethylene, is not subject to corrosion. Furthermore, it will be noted that the bearings 22, 27, and 32 are mounted exteriorly of the main pump body and are not subject to attack by the fluid being pumped, if it is of a corrosive nature. Suitable stuffing boxes and split glands for taking up the packing and replacing packing are provided, these elements having the effect of preventing leakage of the fluid along the shaft. Mechanical seals could be used in place of packing where necessary. In this type of pump, of course, the span of the shaft between the bearings is relatively large and in prior art pumps considerable difficulty has been experienced with stress of the conjugate members relative to one another. This causes breakdown of the operative surfaces and loss of true conjugate action. In the present case, the conjugate screw body 30 is formed of an elastomer material so that the coefficient of friction is reduced, thereby minimizing breakdown of operative surfaces. On the other hand, because of the considerable strength of the sleeve 33 and the shaft 14 on which it is mounted, the pump is capable of high driving torque and is capable of maintaining accurate geometric positioning so that the conjugate surfaces may cooperate properly. By use of the crossed helical ribs or flanges 46 and 47 the screw body 30 is securely locked to the sleeve 33. The fact that the helical ribs are at approximately a right angle to the line of forces, i.e., perpendicular to the screw 51, assures the most secure possible locking effect. The flanges 36 and 39 tend to prevent axial movement between the elastomer body and the metal sleeve.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A pump, comprising a housing having an entrance port and an exit port, a pair of parallel shafts extending through the housing and rotatably mounted therein, a member consisting of a metal sleeve and a conjugate screw body formed of an elastomer material mounted on each shaft to cause fluid to flow from the entrance port to the exit port, and a pair of opposite hand helical flanges formed on the exterior of the sleeve and embedded in the body.

2. A pump, comprising a housing having an entrance port and an exit port, a pair of parallel shafts extending through the housing and rotatably mounted therein, a metal sleeve mounted on each shaft and having a radial flange at each end, a conjugate screw body formed of polytetrafluoroethylene molded on the sleeve between the flanges, the screw bodies cooperating to cause fluid to flow from the entrance port to the exit port, and a pair of helical flanges formed on the exterior of the sleeve and embedded in the body, the flanges being of opposite hand and of short lead so that they cross at least twice between the flanges.

3. A pump, comprising a housing having an entrance port and an exit port, a shaft extending through the housing and rotatably mounted therein, a metal sleeve mounted on the shaft, a conjugate body formed of polytetrafluoroethylene molded on the sleeve to cause fluid to flow from the entrance port to the exit port, and a pair of helical flanges formed on the exterior of the sleeve and embedded in the body, the flanges being of opposite hand and of short lead so that they cross between the ends of the sleeve.

References Cited in the file of this patent

UNITED STATES PATENTS

| | | |
|---|---|---|
| 2,220,588 | Thompson | Nov. 5, 1940 |
| 2,362,106 | Ungar et al. | Nov. 7, 1944 |
| 2,463,460 | Hodgkinson | Mar. 1, 1949 |
| 2,567,699 | Devlin | Sept. 11, 1951 |
| 2,619,040 | Maisch | Nov. 25, 1952 |
| 2,697,402 | Lindquist | Dec. 21, 1954 |
| 2,868,442 | Nilsson | Jan. 13, 1959 |
| 2,880,676 | Succop | Apr. 7, 1959 |
| 2,966,860 | Maynard | Jan. 3, 1961 |

FOREIGN PATENTS

| | | |
|---|---|---|
| 525,761 | Great Britain | Sept. 4, 1940 |